United States Patent [19]

Grant

[11] Patent Number: 4,772,969

[45] Date of Patent: Sep. 20, 1988

[54] "EXPANDABLE LOOP" METHOD OF AND APPARATUS FOR AUTOMATICALLY THREADING A WEB MATERIAL

[75] Inventor: Frederic F. Grant, Bellflower, Calif.

[73] Assignee: Datatape Incorporated, Pasadena, Calif.

[21] Appl. No.: 33,307

[22] Filed: Apr. 2, 1987

[51] Int. Cl.⁴ .......................... G11B 5/08; G11B 15/58
[52] U.S. Cl. ........................................ 360/85; 360/95; 242/182
[58] Field of Search ...................... 360/85, 95; 226/95; 242/182, 183

[56] References Cited

U.S. PATENT DOCUMENTS

| | | | |
|---|---|---|---|
| 2,954,911 | 10/1960 | Baumeister et al. | 226/95 |
| 3,134,527 | 5/1964 | Willis | 226/97 |
| 3,254,854 | 6/1966 | Deighton et al. | 242/55.12 |
| 3,617,650 | 11/1971 | Morello | 360/95 |
| 3,898,693 | 8/1975 | Chang | 242/183 X |
| 3,940,791 | 2/1976 | Kayan et al. | 360/95 |
| 3,986,651 | 10/1976 | Grant | 226/95 |
| 4,194,661 | 3/1980 | Grant | 226/95 |
| 4,315,287 | 2/1982 | Noguchi | 360/95 |
| 4,316,568 | 2/1982 | Grant et al. | 226/118 |
| 4,413,293 | 11/1983 | Hathaway | 360/85 |
| 4,700,909 | 10/1987 | Lohrenz et al. | 242/182 |

FOREIGN PATENT DOCUMENTS

| | | | |
|---|---|---|---|
| 2740837 | 3/1978 | Fed. Rep. of Germany | 242/182 |
| 1133810 | 4/1957 | France | 242/182 |
| 53-138706 | 4/1978 | Japan | 360/95 |

Primary Examiner—John H. Wolff
Attorney, Agent, or Firm—Dennis P. Monteith

[57] ABSTRACT

A method of and apparatus for automatically threading a web material from a supply reel to a take-up reel along an external transport path. In a preferred embodiment, the transport path is defined by a plurality of transport elements, arranged to cooperatively communicate with the oxide surface (the information-bearing side) of a magnetic tape, to cooperatively guide the tape along its transport path past a magnetic head station. A vacuum source serves for establishing an air pressure gradient the effect of which is to controllably pull tape, spanning the tape supply and take-up reels, toward the transport elements in the form of an expandable loop which takes the shape of the tape transport path when the loop expands to bring the information-bearing side of the tape into operative engagement with each transport element.

11 Claims, 4 Drawing Sheets

"EXPANDABLE LOOP" METHOD OF AND APPARATUS FOR AUTOMATICALLY THREADING A WEB MATERIAL

FIELD OF THE INVENTION

The present invention relates generally to automatically threading an elongate strip of web material. More particularly, the invention relates to a method of and apparatus for threading magnetic tape spanning a supply reel and a take-up reel of a cassette along an operative path past a magnetic transducer head external to the cassette.

DESCRIPTION RELATIVE TO THE PRIOR ART

Various techniques are known in the prior art for automatically threading an elongate strip of web material spanning a supply reel and a take-up reel. With respect to a cassette containing the web material and, more particularly with respect to a magnetic tape cassette, tape threading is commonly accomplished by an elaborate and complicated mechanism for extracting tape from the cassette and threading the tape along an operative path past a magnetic transducer station external to the cassette.

In one such mechanism for use with a rotary head scanner, a pair of roller guides, mounted on one end of a pivotal tension arm, extracts tape partially from a cassette. A servomechanism for tape reel drive motors maintains the tape under proper tension. Once the tape is partially extracted, entrance and exit guide posts, mounted on respective motor driven carriers, serve to pull the tape toward its final destination where it is wrapped partially around the head scanner at a required helical angle. Before the tape can be actually transported at the proper helical angle, however, additional linkages, in the form of pushrods and levers, are required for changing the respective elevations of the guide posts during movement to their respective final tape-engaging positions. For the threading operation to work precisely, as is required for tracking control by a head scanner, the shafts of the guide posts come into contact with "prisms" of the V-block type required for locating and locking the guides in their final positions.

Conversely, the unthreading of the tape requires all the previously described movements in respective opposite directions and in reverse sequence. As can be appreciated by those skilled in the art, a tape-threading mechanism of this type is relatively expensive and involves many steps in its manufacture. Also, whether loading or unloading tape, either sequence of operations is relatively time-consuming.

There is also known in the prior art an automatic threading technique in which a web material is extracted from a cassette, under the influence of differential air pressure, to be placed in its operative transport path past a transducer station external to the cassette. U.S. Pat. No. 3,617,650 is exemplary of a threading technique which involves using an air pressure gradient merely for pulling the web material—in this case magnetic tape—from the cassette. To actually bring the information-bearing surface of the tape into its final operative position, however, a movable plate, which carries a magnetic transducer head and guide rollers, is moved out of the path of the tape loop as it is pulled from the cassette. When the tape loop, now external to the cassette, expands beyond the movable plate, an appropriate linkage serves to move the plate to bring the head and rollers into their respective operational positions inside the tape loop. Once this occurs, the air pressure gradient is removed and the tape, under the influence of a reel drive motor, is pulled back towards the cassette into engaging position with the movable head and rollers.

Although a "hybrid" threading mechanism of this type—pneumatic and mechanical—is perhaps simpler, and therefore less costly, than a strictly mechanical threading mechanism, it still suffers from the disadvantage of being relatively complicated and expensive in its manufacture.

Underlying the approaches taken by the prior art is a general belief that the life of magnetic tape may be extended if the elements of a tape transport path are arranged to provide minimum contact with the oxide side—the information-bearing surface—of the tape. Although it may arguably serve to some extent to extend tape life, a transport arrangement of this type presents a problem in that it is now more difficult to automatically position tape along the transport path since the tape must be placed between transport elements located entirely or primarily on the non-oxide side of the tape, and the transducer head which must be located on the other side.

SUMMARY OF THE INVENTION

In view of the foregoing, an object of the invention is to provide a method and apparatus, of relatively simple design and construction, for automatically threading an elongate strip of web material, spanning a supply reel and a take-up reel, along an external transport path past a transducer station. Although the web material can take a variety of forms such as paper, photographic film, etc., the method and the apparatus in accordance with the invention are particularly suitable for use with threading magnetic tape from a cassette.

Underlying the concept of the present invention is the recognition that wear and tear of magnetic tape arises primarily from interaction between the tape and a magnetic transducer head—either read or write. Other sources of tape wear and tear—handling by a tape operator, environmental conditions, and interaction with tape transport elements—although to varying degree may be avoidable, are nevertheless generally less severe.

With such recognition in mind, the object of the invention, insofar as it relates to threading magnetic tape, is achieved by use of an "expandable loop" concept in which the tape transport elements are arranged, like the location of a magnetic transducer head, on the oxide surface side of the tape, since it is the transducer head, which must be on that side of the tape anyway, that causes the most tape wear and tear during tape transport movement. With this arrangement, there is no transport element, between the tape spanning a supply reel and a take-up reel and the tape transport path itself, obstructing or hindering the threading of the tape along its transport path.

To actually thread the tape, the object of the invention is fully achieved by means of a vacuum source for providing an air pressure gradient the effect of which is to draw the tape spanning the two reels towards the transport elements in the form of a loop which conforms to the shape of the transport path when the tape loop expands into operative engagement with the transport elements and the transducer head.

The inventive concept further recognizes that, by use of a vacuum source for threading the tape into, and for maintaining tape in, its operative path, some, but not all, tape transport elements may be of the air-bearing type, which serve not only to clean the tape but which have effectively no adverse effect on tape life. In particular, the vacuum source lends itself readily to providing air-bearing guides and guide rollers for controlling tape direction and/or elevation and one or more vacuum columns serving the function of tape tension control. The vacuum columns also serve advantageously in helical scan tape recorder apparatus for twisting the tape to provide a proper helical angle - an angle other than zero degrees - at which the tape is moved past the operative plane of a rotatably mounted headwheel.

These advantages of the invention, as well as the advantages of eliminating complex mechanical mechanisms customarily required for a tape-threading operation, will become more apparent in the detailed description of a preferred embodiment presented below.

DESCRIPTION OF THE DRAWINGS

The invention will be described with reference to the accompanying drawings, wherein.

DETAILED DESCRIPTION OF A PREFERRED EMBODIMENT

Because web transport apparatus, and in particular magnetic tape transport apparatus, are well known, the present invention will be directed in particular to elements forming part of, or cooperating directly with, the present invention. It is to be understood that elements not specifically shown or described herein may be selected from those known in the web transport art. In that regard, the term "transport element" as used herein shall mean and refer to an "active" element, like a capstan, which acts to pull or push magnetic tape along its transport path, and a "passive" element, like a guide roller, which merely serves to change the direction or the elevation of the tape.

Figure 1:
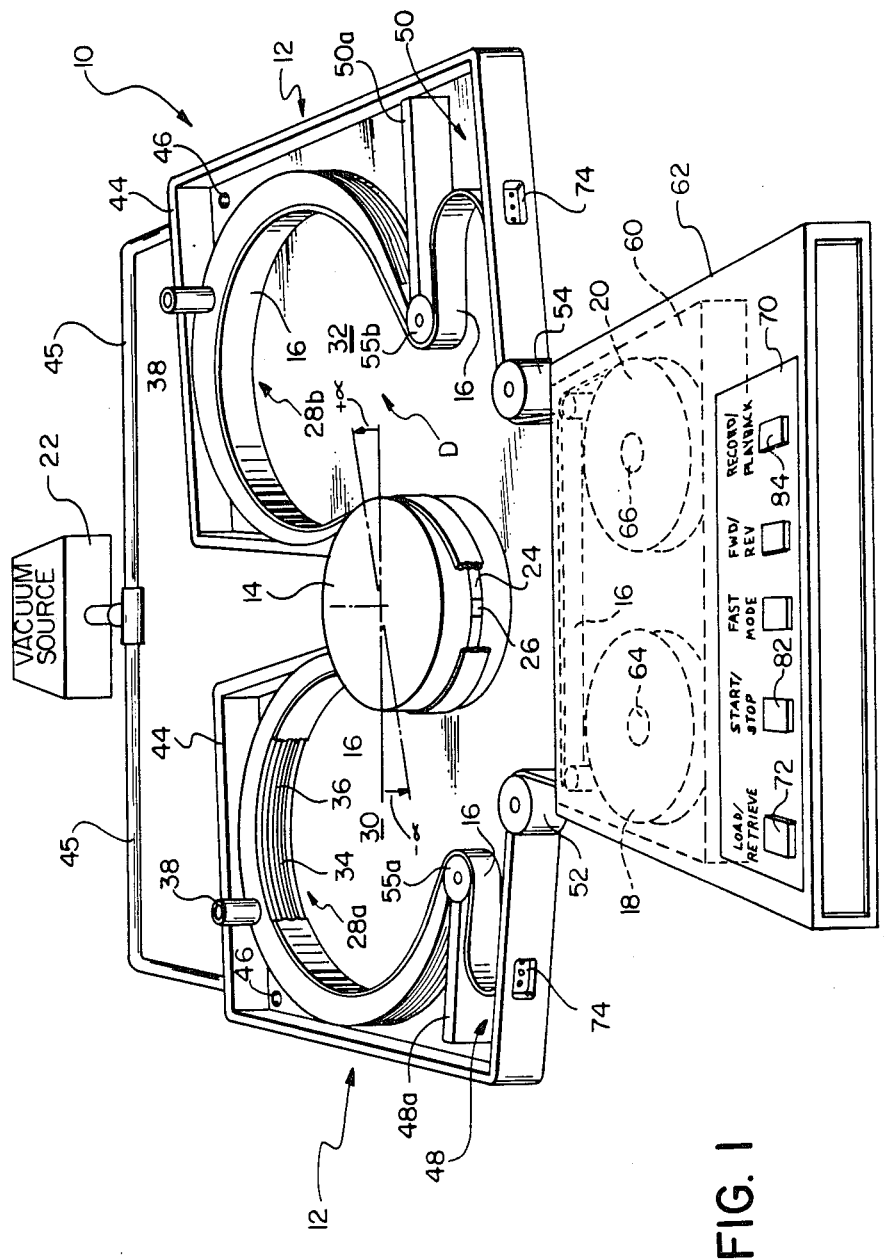
FIG. 1 is a perspective view showing tape transport elements for moving a magnetic tape external to a tape cassette past a head scanner at a predetermined angle other than zero degrees.

An object of the invention is to provide a method and apparatus for automatically threading an elongate strip of web material, spanning a supply reel and a take-up reel, along an external transport path past a transducer station. To that end, FIG. 1 shows apparatus 10, according to a preferred embodiment of the invention, including a series of transport elements arranged to form a cooperative pair of symmetrical paths, on opposing sides of a magnetic transducer head station 14, for guiding magnetic tape 16 from a supply reel 18 past the transducer head station and back to a take-up reel 20. For that purpose, the transport elements are arranged, like the transducer head station 14, to communicate with the oxide side—the information-bearing surface—of the magnetic tape 16. From the description to follow, it will be clear to those skilled in the art that an upper covering wall is omitted from the apparatus 10 of FIG. 1, for purposes of more clearly illustrating the invention.

Further to achieving the object of the invention, the apparatus 10 includes a vacuum source 22 for establishing an air pressure gradient the effect of which is to controllably pull tape 16 spanning the reels 18, 20, as shown by phantom lines, into the tape transport path. To that end, the tape 16, spanning the two reels, is sucked away from the reels, under the influence of differential air pressure, in the form of an expandable loop which takes the shape of the tape transport path when the tape loop expands into operative engagement or communication with each transport element.

In a preferred embodiment of the invention, the transducer station 14 comprises a rotary head scanner arranged to rotate a headwheel 24 in a predetermined operative plane. With a head scanner at the transducer station 14, the elements of the tape transport path serve to guide the tape 16 at a predetermined angle ($\alpha$), other than zero degrees, relative to a plane of rotation of the headwheel 24 while the tape is wrapped at least partially around the head scanner. In doing so, one or more magnetic record/playback heads 26, angularly distributed on the periphery of the headwheel 24, sweep transversely across the tape 16 along spaced record tracks as the tape is transported from the supply reel 18 to the take-up reel 20. As made apparent hereinbelow, however, elements constituting the tape transport path may readily be arranged to guide the tape 16 past one or more stationary magnetic heads or a headstack, each head tracing an elongate record track parallel to an edge of the tape.

To effect its tape guiding function, while communicating solely with the oxide side of the tape 16, the apparatus 10 includes a pair of elongate concave air-bearing guides 28 (28a, 28b) disposed immediately adjacent and tangential to opposing sides of a circumferential surface of the rotary head scanner. Each concave guide 28 terminates at an appropriate elevation and angle relative to the head scanner, to cause the tape 16 to proceed onto and off the head scanner at a desired angle and location. For that purpose, the guide 28a, which is located on the tape-entering side of the head scanner, is disposed in a first reference plane 30 relative to the plane of the headwheel 24; similarly, the guide 28b, which is located on the tape-exiting side of the scanner, is disposed in a second reference plane 32 relative to the headwheel plane.

Figure 2:
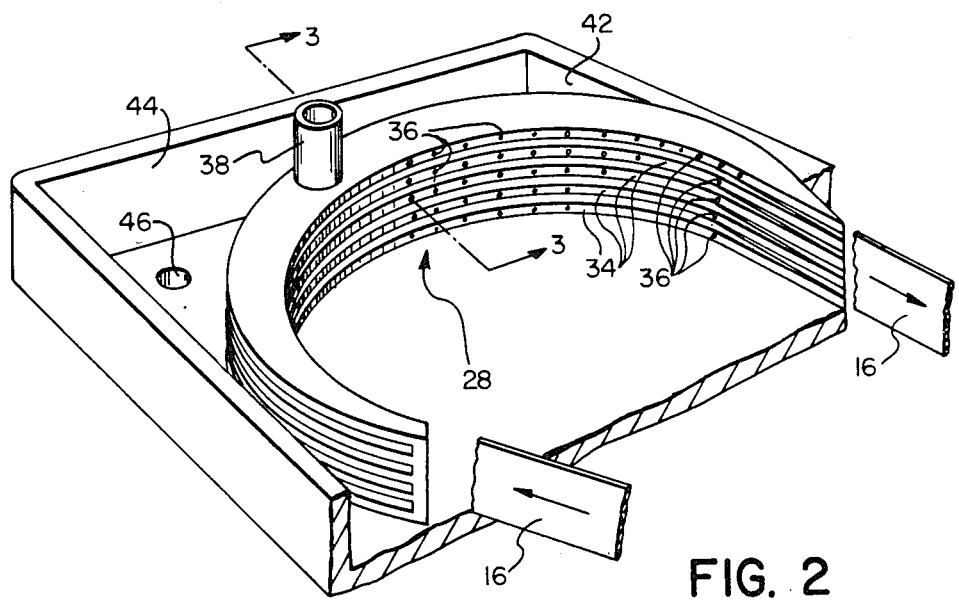
FIG. 2 is a perspective view of a concave air-bearing guide for guiding the magnetic tape.

FIG. 2 illustrates one of the concave air bearing guides 28 in further detail. As shown, the guide 28 comprises a series of spaced parallel tubes 34 each of which has an arcuate forward surface adjacent the oxide side of the magnetic tape 16. The forwardly facing surfaces of the respective tubes 34 are co-planar for cooperatively forming a concave air-bearing surface to guide the tape 16.

To that end, the forwardly facing surface of each tube 34 has a series of relatively small—about 8-mil diameter—vent holes 36 spaced equally in the direction of tape movement for supporting the tape 16 on a thin film of air. A nozzle 38, extending in the widthwise direction through the guide 28 and connected to an air source (not shown), serves to fill each tube 34 with air under positive pressure (approximately five psi). The vent holes 36 are spaced about eighty mils apart, to assure a continuous air film between the tape 16 and the guide 28.

Figure 3:
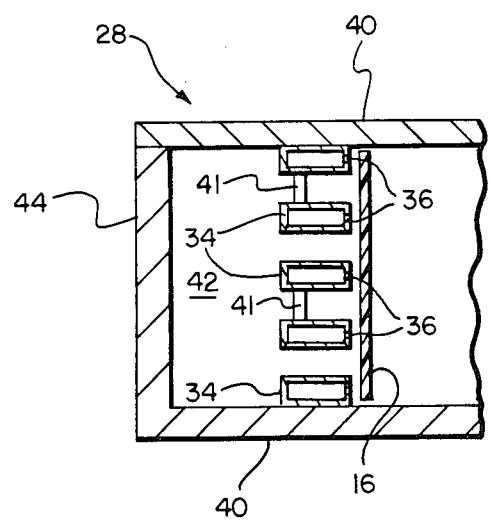
FIG. 3 is a cross-sectional view of the concave air-bearing guide taken along the lines 3—3 of FIG. 2.

FIG. 3, which illustrates a guide 28 along the lines 3—3 of FIG. 2, shows the means by which tape 16 is drawn into operative communication with the concave surface of each air-bearing guide. Spaced top and bottom walls 40 serve to cooperatively house each guide 28 and to thereby contain lateral movement of the tape 16. As disclosed previously, the holes 36 vent their respective tubes 34 from their forwardly facing surfaces to provide an air film supporting the tape.

Spacers 41, angularly distributed between adjacent tubes 34, serve to support the tubes and to thereby maintain a proper air gap therebetween. Preferably, the width of each gap is approximately the width of a tube 34. A chamber 42, between the rearwardly facing side of each of the tubes 34 and a rear wall 44 of each guide 28, serves as a channel through which air is drawn through the gaps separating the tubes, in a direction away from the oxide side of the tape 16. To that end, a conduit 45 (FIG. 1), connected to a drain 46 (also FIG. 1), couples the chamber 42 of each guide 28 to the vacuum source 22.

U.S. Pat. No. 3,986,651, which issued in the name of the inventor for the present application, discloses a concave air-bearing guide which provides an air film between an elongate tape-guiding surface and the non-information bearing side of magnetic tape.

Referring back to FIG. 1 to complete the description of the tape transport path, a pair of identical vacuum columns 48, 50 provides the function of controlling tape tension under the influence of fluctuations in the speed of their corresponding tape reel. For that purpose, a pair of truncated inner walls 48a, 50a serve conveniently to vent the respective vacuum column to the convex side of the corresponding air-bearing guide 28, to maintain proper pressure. To that end, the vacuum source 22 serves advantageously as a means for drawing the proper vacuum in each of the columns 48, 50.

Each vacuum column 48, 50 also functions to change the elevation of the tape 16 in the appropriate direction between the plane of the tape reels and the plane of the corresponding air bearing guide 28. For that purpose, the vacuum column 48 on the tape-entering side of the head scanner is positioned in the aforementioned plane 30; similarly, the vacuum column 50 is located in the plane 32.

A pair of cylindrical tape guides 52, 54, perpendicular to the operative plane of the headwheel 24, serves to change the direction of the tape 16 between a tape reel and its corresponding vacuum column. To that end, both tape guides 52, 54 are preferably of the air-bearing type because they can be conveniently supplied with air from the aforementioned source feeding the tubes 34 of each concave guide 28.

A dual-motor dual-capstan drive is favored for a preferred embodiment of the invention. To that end, a capstan 55a, arranged on the slope of the plane 30, serves for controlling tape speed from the supply reel 18 into the air-bearing guide 28a whereas a capstan 55b, on the slope of the plane 32, functions for tape speed control through the air-bearing guide 28b to the take-up reel 20. Alternatively, a single capstan drive may be used. In that case, the capstan 55a would be replaced by an air-bearing guide, similar to the guide 52, because a single capstan can pull tape more effectively than it can push tape across a magnetic record/playback head. In a preferred embodiment of the present invention, each capstan is preferably of the vacuum-type with capstan air pressure controlled conveniently by the vacuum source 22.

Figure 4:
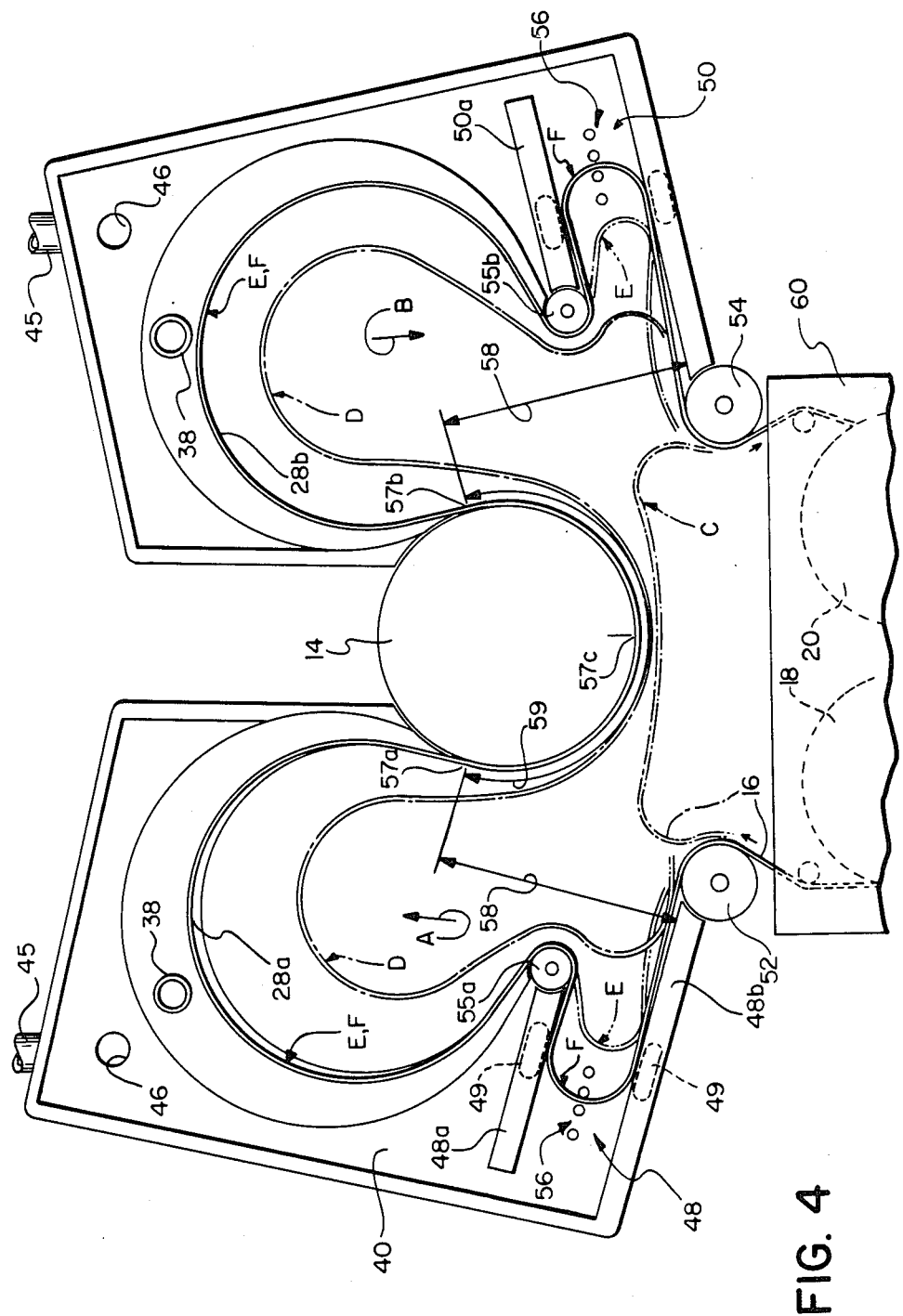
FIG. 4 is an overhead view of the tape transport elements of FIG. 1 showing the magnetic tape at various points in time during the loading of the tape from the cassette.

FIG. 4 provides a planar overhead view of the tape transport path for clearly illustrating the relative size and spacing of the tape transport elements. In traveling from the guide 52 into the vacuum column 48, the tape 16 twists to follow the slope of the plane 30 of the vacuum column 48 and the air-bearing guide 28a. To prevent rubbing of the tape against the vacuum column 48, the cylindrical tape-guiding surface of the guide 52 projects slightly beyond the plane of the exterior wall of the vacuum column 48, as shown. To further protect the tape 16 from rubbing, a source of pressurized air may be provided in the vacuum column 48 at points 49 to feed an air bearing where the tape may tend to rub.

Spaced sensors 56 serve to sense the length of tape in each vacuum column, for controlling the tape reel drive motors. Tape sensing can be done by means of one or more air pressure sensors or by more conventional means including a linear array of photocells activated by a light source on the opposite vacuum column wall.

Each air-bearing guide 28 functions to guide the tape 16 at the appropriate elevation and angle past the headwheel 24. In a preferred embodiment of the invention, the tape helix angle is 5.4 degrees (5.4°). For guiding the tape 16 at the desired angle, the plane 30 of the guide 28a and the vacuum column 48 slopes relative to the plane of the headwheel 24, as denoted by the direction of the arrow A, at 5.4°. Similarly, the plane of the tape exiting guide 28b, in complementing the guide 28a, slopes in an opposite direction at 5.4°, as denoted by the arrow B, relative to the headwheel plane.

For guiding the tape 16, the air-bearing guide 28a terminates immediately adjacent and tangent to the circumferential surface of the head scanner 14 at a reference tape-entering point denoted 57a. Similarly, the air-bearing guide 28b is arranged adjacent and tangent to the head scanner at a corresponding tape exiting point 57b. To guide the tape 16 at the appropriate elevation, the head scanner is spaced equally from both vacuum columns 48, 50. For a reason made apparent hereinbelow, the head scanner 14 and its location are selected so that a distance 58, illustrated by each of the two double-header arrows, equals one-half of the distance 59 which the tape 16 travels while wrapped around the head scanner.

Figure 5:
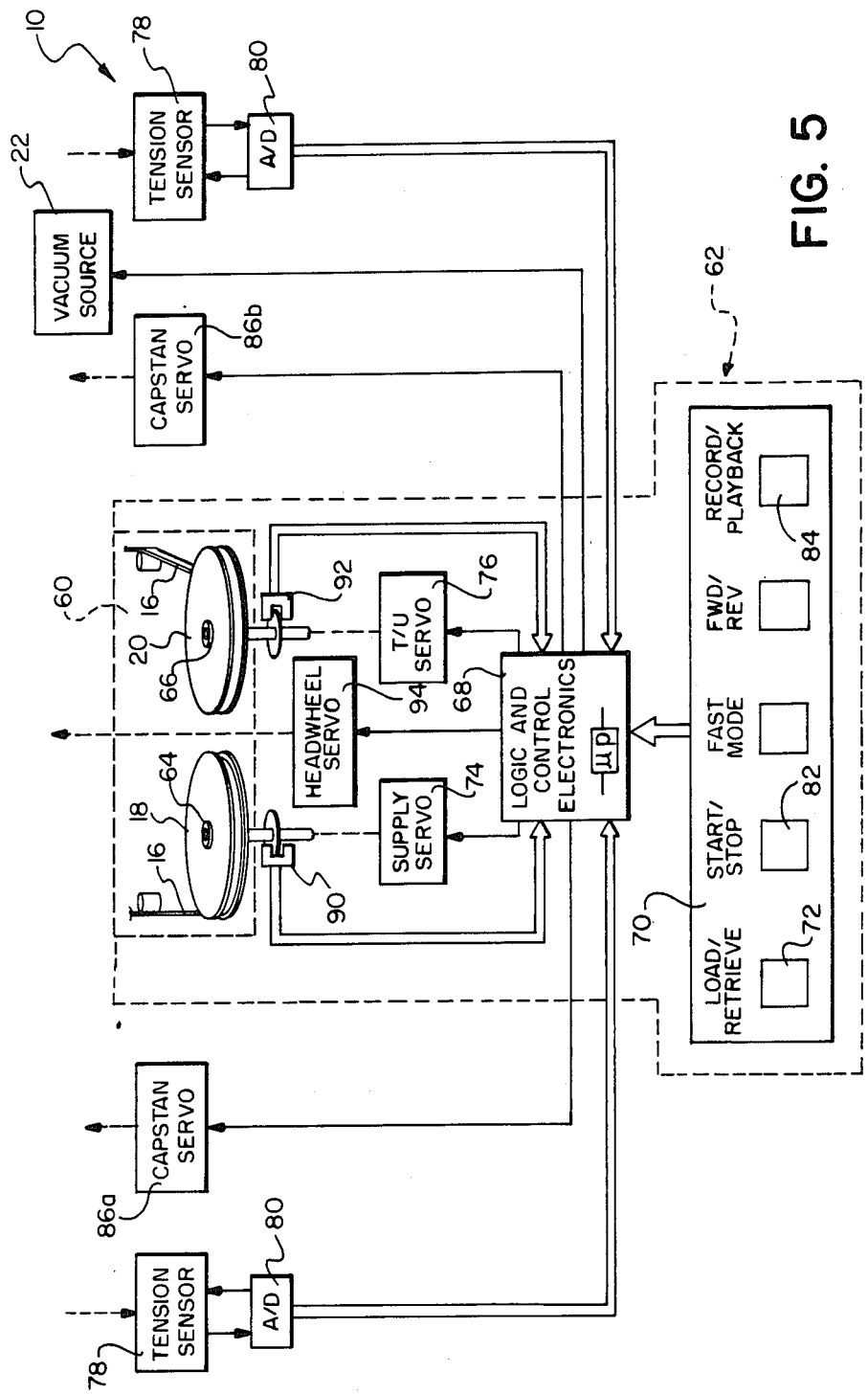
FIG. 5 is a schematic block diagram of the electrical control system for the tape transport apparatus of FIG. 1.

Reference should now be made to FIGS. 1, 4, and 5 regarding a description of the operation of the apparatus 10. Elements of FIG. 5 that are otherwise identical to or substantially the same as elements of FIG. 1 are identified by like numerals.

FIG. 1 shows in phantom a magnetic tape cassette 60 mounted within a mechanism 62 of the front-loading type. The cassette 60 may take any of a variety of conventional styles or designs in which an elongate strip of magnetic tape 16, suitably wound on a pair of spaced reels 18, 20—one for supply and the other for take-up—bridges the two reels immediately adjacent a front-loading side of the cassette. A suitable design, for example, is a standard VHS- or Beta-format video cassette or the American National Standard proposed in October, 1985 for three sizes of cassettes for 19 mm tape for use with D-1 digital television recording format.

The mechanism 62 serves to automatically position the supply reel 18 and the take-up reel 20 of the cassette 60 on motor-driven hubs 64 and 66, respectively, generally in the plane of the headwheel 24. During the cassette-loading operation, the mechanism 62 causes a front-loading hinged door (not shown) of the cassette 60 to open, thereby exposing the tape 16 bridging the two reels.

FIG. 5 shows microprocessor-based logic and control electronics 68 which controls the apparatus 10 via operator input provided through a control panel 70 of the mechanism 62. A load switch 72 serves for automatically threading tape 16 along its transport path external to the cassette 60. For that to happen, the electronics 68, in response to actuation of the switch 72, energizes the vacuum source 22 and the aforementioned source of positive air pressure for the tubes 34 of each guide 28. When this occurs, the source 22 evacuates air from the interior of apparatus 10 while air under positive pressure is applied through the vent holes 36 of the tubes 34. To evacuate air, the source 22 draws air through the gaps between the tubes 34 into drains 46 connected to the conduits 45. The net effect is to create a negative air pressure gradient from the front face of the cassette 60 to the transport path 12. This pressure gradient exerts forces which try to pull or to suck the tape 16, spanning the two reels, into the apparatus 10.

To permit the tape 16 to be pulled from the cassette 60, the electronics 68, also in response to the actuation of the load switch 72, serves to cooperatively drive a supply reel servomechanism 74 and a take-up reel servomechanism 76 so that tape 16 is controllably released from the cassette into the apparatus 10 under the influence of the air pressure gradient. For that to occur, the servomechanism 74 preferably drives the supply reel 18 to increase the length of the tape 16 spanning the two reels. This may also be done by driving the take-up reel 20 in the reverse direction or driving both reels relative to each other to provide excess tape therebetween.

A further arrangement, also within the scope of the present invention, includes allowing one or both of the tape reels to "free run" as tape 16 is pulled from the cassette 60. With this arrangement, the length of the tape spanning the two reels may be controlled by appropriately enabling a reel brake mechanism when a required amount of tape is pulled from the cassette 60.

As the length of the tape 16 between the two reels increases, the air pressure gradient causes the excess or slack tape to be disgorged from the cassette 60 in the form of an expandable loop in the direction of the tape transport path. FIG. 4 illustrates the size and the shape of the tape loop at different points in time as tape is controllably spewed from the cassette 60. The arrow C identifies the shape of the expandable loop as the tape 16 is initially drawn from the cassette 60.

Larger forces act to pull the tape 16 toward each air-bearing guide 28 than toward each vacuum column because the opening for each air-bearing guide is wider than the opening to each vacuum column. Arrow D shows that the leading edge of the tape loop moves toward each guide 28 before it is drawn into each vacuum column.

Arrow E illustrates that the tape loop is only partially drawn into each vacuum column by the time the tape 16 is pulled fully into operative communication with each air-bearing guide 28. In that position, the tape 16 sits on the aforementioned air film produced by each guide 28.

Finally, arrow F shows the tape loop now pulled fully from the cassette 60. In that position, the tape loop wraps partially around the head scanner and takes the shape of the tape transport path external to the cassette 60.

A tape tension sensor mechanism 78, associated with the aforementioned sensors 56, serves to control the length of the tape 16 in each vacuum column. For that purpose, each sensor mechanism 78 provides an appropriate signal which the logic and control electronics 68 uses to terminate the threading operation when appropriate lengths of tape are drawn into both vacuum columns.

An A/D converter 80, associated with each sensor mechanism 78, provides a signal, in digital form, to the logic and control electronics 68, corresponding to the length of tape filling each vacuum column. The electronics 68 functions to cause the tape reel drive servo—either servo 74 or 76 or both—to terminate the feeding of tape when both vacuum columns are loaded with the proper length of tape 16 during a threading operation.

A start button 82 serves for actually initiating transporting of the tape 16 from the supply reel to the take-up reel 20 along its operative path past the head scanner. A switch assembly 84 functions for initiating recording or playback during tape transport movement.

For transporting the tape 16 at a desired speed, the logic and control electronics 68, in response to the actuating of the button 82, serves to energize dual capstan servos 86a, 86b for driving the corresponding pair of capstans 55a and 55b (FIGS. 1 and 4). The air pressure gradient holds the tape 16 in constant contact with each capstan. As each capstan turns, the friction between it and the tape causes tape transport movement at a desired speed.

Under normal tape-drive conditions, the supply reel 18, under the control of supply servo 74, passes tape into the vacuum column 48 at a rate which keeps the supply of tape in the vacuum column relatively constant. To that end, an encoder 90 provides a signal corresponding to the actual speed of the supply reel 18. The logic and control electronics 68, in response to the output of the encoder 90 and the output of the A/D converter 80, causes the supply reel servo 74 to adjust its output so that the supply reel 18 corrects the speed at which it is giving out tape.

In a parallel operation, an encoder 92 provides a signal corresponding to the speed of the take-up reel 20. The logic and control electronics 68, in response to the output of the encoder 92 and the output of the A/D converter 80 for the vacuum column 50, controls the speed at which the take-up reel 20 collects tape.

The tape 16 leaves the supply reel 18 at one end of the tape transport path and a similar amount of tape enters the take-up reel 20 at the opposite end of the transport path. Except for the difference in elevation between the two halves of the tape transport path, the tape path on one side of the head scanner is substantially the mirror image of the tape path on the other side of the head scanner. Because of that symmetry, the following description will be generally limited to the half of the tape transport path that feeds tape onto the head scanner.

The capstan 55a, on the tape-entering side of the head scanner, serves to regulate the speed of the tape 16 going into the air-bearing guide 28a. The guide 28a, in turn, functions to guide the tape 16 at the appropriate elevation and angle onto the head scanner 14.

While wrapped around the head scanner 14, the tape travels up the helix from the tape-tangency point 57a to midpoint 57c at the helix angle of 5.4°, and from the midpoint an equally further distance up the helix to the tape-tangency point 57b. At midpoint 57c, the tape 16 has returned to the elevation it had when it exited the cassette 60. Likewise, after traveling further up the helix and exiting the head scanner at point 57b, the tape 16 curves generally downwardly in elevation, to return to its starting elevation upon exiting the vacuum column 50.

The net decrease in elevation that the tape 16 undergoes as it travels from the supply reel 18 to where it enters the head scanner 14 (tape-tangency point 57a) is directly proportional to the distance 58. The net increase in tape elevation as it travels from point 57a to the midpoint 57b of the head scanner 14 is equal to the decrease in tape elevation from the reel 18 to the entry point 57a of the head scanner. Accordingly, the distance 58, on the tape-entering side of the transport path, equals one-half of the distance 59 that the tape 16 travels while in contact with the head scanner. By similar logic, the distance 58, on the tape-exiting side of the head scanner, must also equal one-half of the tape-wrap distance 59.

For recording or playback, the logic and control electronics, in response to the activating of the switch assembly 84, causes a servo 94 to rotate the headwheel 24 at a desired speed. In that operation, the tape 16 moves at a precise speed past the head scanner under the control of the dual capstans 55a, 55b. During transport movement, the tape 16, under the dual influence of the air pressure gradient and the guiding action of the air-bearing guides 28a, 28b, passes the head scanner at the aforementioned helix angle $\alpha$ of 5.4° relative to the plane of the headwheel 24, thereby enabling the magnetic heads 26 to sweep transversely across the tape along spaced record tracks.

From the foregoing, it will be clear to those skilled in the art that apparatus 10 offers several clear and distinct advantages over magnetic tape transport apparatus known in the art. For example, tape threading, in accordance with the invention, is fully pneumatic, except for the controlling of the rotating of one or both tape reels. This arrangement not only provides a simplified, and therefore less expensive design, but provides tape threading (or loading) which is significantly faster and more gentle with less likelihood of creasing or damaging the tape with loss of data than that which is achievable with the prior art.

Vacuum columns, which control tape tension so that reeling perturbations are well isolated, also serve conveniently for facilitating the angle at which tape is guided past the head scanner.

The capstans 55a, 55b can control tape motion in either direction. For fast forward or fast reverse, the vacuum source 22 can be turned off and the tape driven directly under the influence of the tape reel drive motors. For limited tape movement in the reverse direction, the tape 16 can be retained in its operative path under the influence of the air pressure gradient. In this mode of operation, a desired region of the tape can be more quickly located since the tape is already loaded.

Furthermore, auxiliary, stationary control heads can be placed along the tape path as required by making a break in either air-bearing guide 28 and mounting the auxiliary head in the break. In this case, the air-bearing guide would be designed in two parts with an in-between space for any head not having vacuum acting on it.

The invention has been described in detail with reference to the figures, however, it will be appreciated that variations and modifications are possible within the spirit and scope of the invention. Patentable features disclosed but not claimed herein are disclosed and claimed in either U.S. patent application Ser. No. 033,272 entitled HELICAL SCAN TAPE GUIDE APPARATUS, or U.S. patent application Ser. No. 033,308 entitled PNEUMATICALLY CONTROLLED TAPE-LOADING TAPE-TRANSPORTING APPARATUS, both of which are filed on even date herewith.

What is claimed is:

1. In apparatus having a transducer station, and means for receiving a first, supply reel and a second, take-up reel which are cooperatively rotatable for moving an elongate strip of flexible web material from the supply reel to the take-up reel, wherein the improvement comprises:
    (a) a plurality of transport elements, arranged together with said transducer station external to said reel receiving means to confront an information-receptive surface of the web material, to guide the web material from the supply reel to the take-up reel along a predetermined operative path past said transducer station; and
    (b) evacuating means for establishing a negative air pressure gradient between said reel receiving means and said transport elements, to cause the spewing of web material, spanning the two reels, in the form of a loop expandable towards said transport elements, the loop conforming to the shape of the predetermined operative path when it expands to bring its information-receptive surface into operative facing relationship with said transport elements.

2. In apparatus having a transducer, means for receiving a cassette containing a first, supply reel and a second, take-up reel which are cooperatively rotatable for moving an elongate strip of flexible web material from the supply reel to the take-up reel, and means for controllably rotating one reel relative to the other reel to increase the length of web material linking the two reels, wherein the improvement comprises:
    (a) a pair of concave guides, arranged external to a received cassette in a material transport direction on opposing sides of said transducer to face together with said transducer an information-receptive surface of the web material, for guiding the latter from the supply reel to the take-up reel along a predetermined operative path past said transducer; and
    (b) evacuating means for establishing an air pressure gradient the effect of which is, in cooperation with said reel rotating means, to draw the excess web material linking the reels from the received cassette toward said concave guides in the form of an expandable loop which conforms to the shape of the predetermined operative path when the web material expands to bring its information-receptive surface into operative communication with said concave guides and said transducer.

3. In apparatus having means for receiving a magnetic tape cassette containing a first, supply reel and a second, take-up reel which are cooperatively rotatable for moving magnetic tape from the supply reel to the take-up reel, means for controllably rotating at least one reel relative to the other reel to increase the length of tape spanning the two reels, and a transducer head displaced from the tape spanning the two reels, wherein the improvement comprises:
  (a) a pair of concave air-bearing guides disposed in a tape transport direction on opposing sides of said transducer head to face the information-bearing surface of the magnetic tape, to cooperatively guide the magnetic tape from the supply reel to the take-up reel along a predetermined operative path immediately adjacent said transducer head; and
  (b) evacuating means for establishing a negative air pressure gradient from said cassette receiving means in the direction of said concave guides, to cause, in cooperation with said reel rotating means, the disgorging of magnetic tape from the received cassette toward said concave guides in the form of an expandable loop which conforms to the shape of the predetermined operative path when the loop expands to bring the information-bearing surface of the tape into operative communication with said concave guides and said transducer head.

4. In transport apparatus having means for receiving a magnetic tape cassette containing a first, supply reel and a second, take-up reel which are cooperatively rotatable for moving magnetic tape from the supply reel to the take-up reel, motor drive means for controllably rotating one reel relative to the other reel to increase the quantity of magnetic tape linking the two reels, and a transducer head external to the tape spanning the two reels, wherein the improvement comprises:
  (a) a pair of tape guides arranged at respective stationary locations in a tape transport direction on opposing sides of said transducer head, each tape guide having a concave air-bearing surface, arranged to operatively engage the information-bearing surface of the magnetic tape, for cooperatively guiding the tape from the supply reel to the take-up reel along a predetermined operative path past said transducer head; and
  (b) evacuating means for establishing an air pressure gradient the effect of which is, in cooperation with said motor drive means, to suck tape from the received cassette toward said tape guides in the form of an expandable loop which conforms to the shape of the predetermined operative path when the tape loop expands to bring the information-bearing surface of the tape into facing relationship with said air-bearing surface of each tape guide.

5. In apparatus having means for receiving a magnetic tape cassette containing a pair of spaced reels which are cooperatively rotatable for moving magnetic tape from one reel to the other reel, motor drive means for controllably rotating at least one reel relative to the other reel to increase the length of tape extending between the two reels, and a transducer head displaced from the tape normally extending between the two reels, wherein the improvement comprises:
  (a) a pair of concave air-bearing guides, arranged external to a received cassette to face an information-bearing surface of the tape, to cooperatively guide the magnetic tape from the supply reel to the take-up reel along a predetermined operative path past said transducer head; and
  (b) evacuating means for establishing a negative air pressure gradient between said cassette receiving means and said air-bearing guides, said evacuating means, in cooperation with said motor drive means, causing the pulling of magnetic tape, under the influence of air pressure, from the received cassette toward said guides in the form of an expandable loop which conforms to the shape of the predetermined operative path when the loop expands to bring the information-bearing surface of the tape into operative communication with each of said air-bearing guides.

6. In apparatus having a rotary head scanner, means for receiving a magnetic tape cassette containing a pair of spaced reels which are cooperatively rotatable for moving magnetic tape from one reel to the other reel, and motor drive means for controlling rotating at least one reel relative to the other reel to increase the length of tape linking the two reels, wherein the improvement comprises:
  (a) a plurality of tape guides, arranged external to a received cassette at stationary locations to face the information-bearing surface of the magnetic tape, for cooperatively guiding the tape from one reel to the other reel along a predetermined operative path external to the cassette past said rotary head scanner; and
  (b) evacuating means for establishing an air pressure gradient directed at said plurality of tape guides, the air-pressure gradient, in cooperation with said motor drive means, controllably spewing excess tape linking the two reels from the received cassette toward said tape guides in the form of an expandable loop which conforms to the shape of the predetermined operative path when the loop expands to bring the information-bearing surface of the tape into operative engagement with said plurality of tape guides.

7. In apparatus having means for receiving a magnetic tape cassette containing a first, supply reel and a second, take-up reel which are cooperatively rotatable for moving magnetic tape from the supply reel to the take-up reel, motor drive means for controllably rotating one reel relative to the other reel to produce an additional amount of tape spanning the two reels, and a transducer head displaced from the tape initially spanning the two reels, wherein the improvement comprises:
  (a) a plurality of transport elements, arranged in a tape transport direction at stationary locations external to said cassette receiving means to face an information-receptive surface of magnetic tape, to cooperatively guide such magnetic tape from the supply reel to the take-up reel of a received cassette along a predetermined operative path external to the cassette past said transducer head; and
  (b) evacuating means, operatively associated with said cassette receiving means, for producing an air pressure gradient the effect of which is to disgorge from the cassette surplus tape spanning the two reels, the tape disgorged being in the form of an expandable loop which conforms to the shape of the predetermined operative path when the tape loop expands to bring its information-receptive surface into operative communication with said plurality of transport elements.

8. A method of automatically threading an elongate strip of flexible web material from a first, supply reel to a second, take-up reel along a predetermined operative path past a transducer station, said method comprising:
  (a) rotating at least one of the reels relative to the other reel to increase the length of web material spanning the two reels; and
  (b) evacuating air from the vicinity of the operative path to create an air pressure gradient the effect of which is to pull excess web material spanning the two reels toward the operative path in the form of an expandable loop which conforms to the shape of the operative path when the loop of web material expands to bring an information-receptive surface of the web material into operative communication with the operative path.

9. A method of automatically threading an elongate strip of flexible web material from a cassette along a predetermined operative path past a transducer station external to the cassette, said method comprising:
   (a) rotating one of a pair of spaced reels contained within the cassette relative to the other reel to increase the length of web material spanning the two reels; and
   (b) spewing web material spanning the two reels from the cassette in the form of an expandable loop by evacuating air from the vicinity of the operative path to create an air pressure gradient, the expandable loop conforming to the shape of the operative path when the loop of web material expands to bring an information-receptive surface of the web material into operative communication with the operative path.

10. A method of automatically threading magnetic tape from a cassette along a predetermined tape transport path external to the cassette, said method comprising:
   (a) rotating at least one of a pair of spaced tape reels contained within the cassette relative to the other reel to increase the length of tape spanning the reels; and
   (b) evacuating air from the vicinity of the tape transport path to create an air pressure gradient the effect of which is to disgorge tape spanning the two reels from the cassette in the form of an expandable loop which conforms to the shape of the predetermined tape transport path when the tape loop expands to bring its information-receptive surface into operative engagement with the tape transport path.

11. A method of automatically threading magnetic tape from a cassette onto a predetermined tape transport path external to the cassette, said method comprising:
   (a) a rotating one of a pair of spaced tape reels contained within the cassette relative to the other reel to increase the length of tape linking the two reels; and
   (b) evacuating air from the vicinity of the tape transport path to create a negative air pressure gradient, between the cassette and the transport path, which causes excess tape between the two reels to be sucked from the cassette in the form of an expandable loop, the tape loop conforming to the shape of the external tape transport path when the information-receptive surface of the tape expands into operative engagement with the tape transport path.

* * * * *